United States Patent
Hill et al.

(10) Patent No.: US 6,183,051 B1
(45) Date of Patent: Feb. 6, 2001

(54) FAIL SAFE ELECTRICAL BRAKE CONTROL SYSTEM FOR AIRCRAFT

(75) Inventors: James L. Hill, Canton; Lee E. McFarland, Akron, both of OH (US)

(73) Assignee: Aircraft Braking Systems Corp., Akron, OH (US)

( * ) Notice: Under 35 U.S.C. 154(b), the term of this patent shall be extended for 0 days.

(21) Appl. No.: 09/241,182

(22) Filed: Feb. 1, 1999

(51) Int. Cl.$^7$ ...................................................... B60T 8/86
(52) U.S. Cl. .................. 303/126; 303/122.03; 303/20; 303/9.61; 303/15
(58) Field of Search .............................. 303/126, 20, 191, 303/15, 117.1, 166, DIG. 3, 3, 9.61, 122.03, 122, 122.04, 122.06; 244/111; 701/70, 71, 78, 79, 75; 188/1.11 R, 158, 161, 163, 181 C; 251/129.09, 129.1; 361/210, 167

(56) References Cited

U.S. PATENT DOCUMENTS

| | | | | |
|---|---|---|---|---|
| 3,807,810 | * | 4/1974 | Yarber | 303/20 |
| 3,847,445 | * | 11/1974 | Bissell et al. | 244/111 |
| 3,917,356 | * | 11/1975 | DeVlieg | 244/111 |
| 3,926,479 | * | 12/1975 | Bissell et al. | 303/126 |
| 4,252,014 | * | 2/1981 | Ruof . | |
| 4,293,165 | * | 10/1981 | Hirzel | 303/126 |
| 4,410,153 | * | 10/1983 | Romero | 303/126 |
| 4,572,585 | * | 2/1986 | Guichard | 303/122.1 |
| 4,760,491 | * | 7/1988 | Hurley | 251/129.09 |
| 4,834,465 | * | 5/1989 | Guichard et al. | 303/15 |
| 5,044,697 | * | 9/1991 | Longyear et al. | 303/14 |
| 5,397,173 | * | 3/1995 | Bourguet . | |
| 5,417,477 | * | 5/1995 | Lasbleis | 303/20 |

\* cited by examiner

Primary Examiner—Douglas C. Butler
(74) Attorney, Agent, or Firm—Renner, Kenner, Greive, Bobak, Taylor & Weber

(57) ABSTRACT

A brake-by-wire control system for aircraft brakes is presented. The system includes a hardware based discrete component control path and a software control path, the two operating in parallel. Each of the paths monitors the same input, with the hardware path being configured to enable the shutoff valve driver and the software path being configured to inhibit the shutoff valve driver, depending upon the status of the inputs. As a consequence, a failure in a single path in the braking system cannot enable the brake system so as to allow for inadvertent braking.

9 Claims, 1 Drawing Sheet

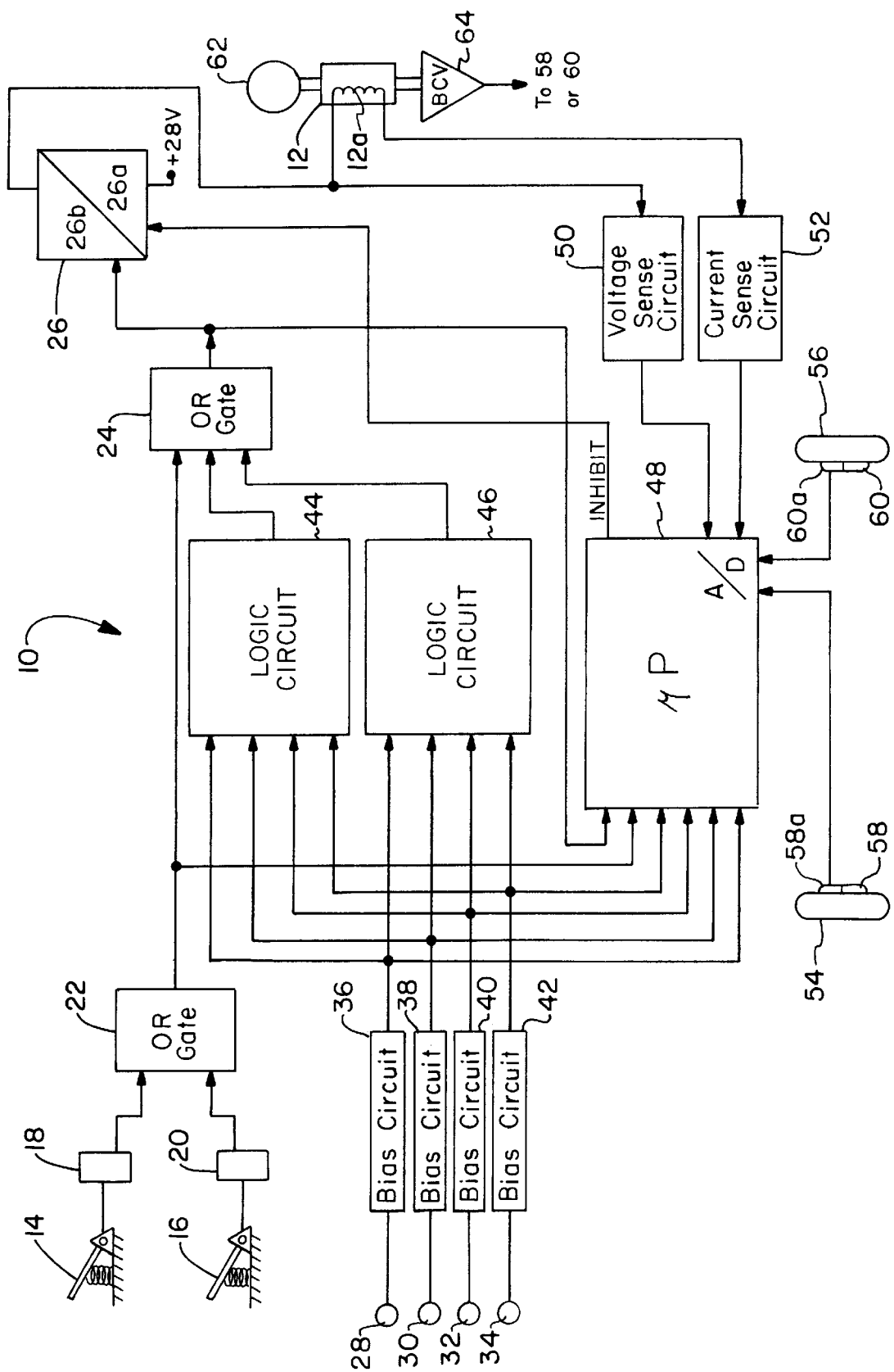

FAIL SAFE ELECTRICAL BRAKE CONTROL SYSTEM FOR AIRCRAFT

TECHNICAL FIELD

The invention herein resides in the art of electrical brake control systems for aircraft. Specifically, the invention relates to an electrical brake control system for aircraft which provides for redundancy in the control system such that at least two faults within the brake control system must occur before there can be any inadvertent application of the aircraft brakes.

BACKGROUND ART

In aircraft braking systems it has always been desirable that inadvertent braking be prevented. In the mechanical braking systems of the past, the likelihood of inadvertent braking has been minimal, since brake metering valves simply do not fail in a "pressure applied" or braking mode. However, the advent of electrical or "brake-by-wire" systems has given rise to concerns that a hardware or software failure could result in undesired brake application. A primary concern in such systems is that a software fault might inadvertently apply brakes. In such brake-by-wire systems, the prior art has taught the use of dual software and dissimilar hardware approaches to achieving this redundancy. However, such approaches increase the cost of the braking systems and necessarily decrease their reliability Since the redundancy necessarily requires the implementation of more hardware and/or software, the maintenance problems are aggravated. It is also known to employ a single software system with a hardware monitor to set the hydraulic pressure at the brake and provide appropriate responsive action with respect thereto, but such systems suffer the same shortcomings, and which enables the brake valves with hardware.

There is a need in the art for a simple fail safe brake-by-wire system for aircraft that does not aggravate the reliability factor by significantly increasing the amount of hardware and software employed.

DISCLOSURE OF INVENTION

In light of the foregoing, it is a first aspect of the invention to provide a fail safe electrical brake control system for aircraft in which the shutoff valve of the brake control system is controlled with all hardware circuits, not software.

Another aspect of the invention is to provide a fail safe electrical brake control system for aircraft in which hardware and software operate in parallel to allow for an effective determination if a failure has occurred.

Still a further aspect of the invention is to provide a fail safe electrical brake control system for aircraft in which hardware and software receive and monitor the same avionics inputs, with a hardware branch determining if the system shutoff valve should be on, and the software branch determining if it should be off.

Yet an additional aspect of the invention is to provide a fail safe electrical brake control system for aircraft which is durable and reliable in use, easy to implement with state of the art aircraft brake control brake-by-wire systems, and which provides a fail safe system of significant integrity.

The foregoing and other aspects of the invention which will become apparent as the detailed description proceeds are achieved by an electrical brake control system for aircraft, comprising: a brake coil shutoff valve providing hydraulic pressure to an aircraft brake system; a shutoff valve driver connected to and selectively actuating said brake control shutoff valve; a pair of operator actuated brake pedals allowing the pilot to regulate the hydraulic pressure applied to brakes of the aircraft; a plurality of switches providing data respecting positional status of a landing gear, a landing gear handle, and a weight on wheel switch; a discrete logic circuit interposed between said plurality of switches and said shutoff valve driver for enabling said shutoff valve driver when said switches are in a first predetermined state; and a software controlled microprocessor interposed between said plurality of switches and said shutoff valve driver for inhibiting said shutoff valve driver when said switches are not in said first predetermined state.

DESCRIPTION OF THE DRAWING

For a complete understanding of the objects, techniques and structure of the invention reference should be made to the following detailed description and accompanying drawing wherein a schematic diagram of a fail safe electrical brake control system for an aircraft is presented.

BEST MODE FOR CARRYING OUT THE INVENTION

Referring now to the drawing, it can be seen that an electrical brake control system for an aircraft is designated generally by the numeral 10. The brake control system 10 interconnects with a shutoff valve 12 of the hydraulic system of the aircraft brake system. The shutoff valve 12, controlled by the coil 12a, inhibits and enables hydraulic pressure to the brake system and, accordingly, enables and disables the operation of the brake system itself. Specifically, the shut off valve 12 is interposed between a source of hydraulic pressure 62 and brake control valves 64 to selectively inhibit or enable the brake control valves 64 to effect braking action through brakes on associated wheels as will become apparent later herein. As shown in the drawings, a left brake pedal 14 and a right brake pedal 16 are provided in the cockpit for actuation by a pilot in standard fashion. With the instant invention contemplating the use of a brake-by-wire control system, the brake pedals 14, 16 are spring biased to provide the "feel" of a hydraulic brake. A linear variable differential transformer (LVDT) is employed in association with each of the pedals 14, 16 to generate a position signal corresponding to the brake pressure requested. In other words, an electrical signal is the output of each of the pedals 14, 16 and that signal corresponds to the brake pressure requested by the associated left or right pedal.

In accordance with the invention, the output signals from the pedals 14, 16 are respectively passed to comparator circuits 18, 20. The analog signals so received from the LVDT's of the pedals 14, 16 are compared to a window having both upper and lower thresholds. The window threshold defines acceptable brake pedal activity. If the analog signal of the pedals 14, 16 falls within the acceptable window, a logic "1" is provided at the output of the associated window comparator 18, 20 and is passed to a logic OR gate 22. The output of the OR gate 22 is passed to a corresponding OR gate 24, such that if either of the brake pedals 14, 16 satisfies the window threshold of the window comparators 18, 20, a logic 1 is the output of the OR gate 22, as is the output of the OR gate 24.

The output of the OR gate 24 passes to the dual shutoff valve driver 26, comprising series connected shut off valve drivers 26a and 26b, which are operative to control the coil 12a of the shutoff valve 12. As will be apparent herein, when both of the valve drivers 26a, 26b are turned on, the coil 12a is energized and the shut off valve 12 is opened to allow brake pedal actuation of the brake control valve 64. The valve driver 26a is controlled by the programmed microprocessor 48, to be discussed later, and the valve driver 26b is controlled by the output of the OR gate 24. Accordingly, if either of the brake pedals 14, 16 emits a brake control signal falling within the window of the associated comparator 18, 20, the shutoff valve driver 26b is operative to energize the coil 12a of the shutoff valve 12 such that the brake system of the aircraft is pressurized and the pressure requested by the pedal 14, 16 can be applied to the associated brakes, provided that the driver 26a is not inhibited by the microprocessor 48. It will be appreciated at this time that the invention is contemplated for use on aircraft having inboard and outboard brake systems on each side of the aircraft, such that the system shown in the drawings is substantially duplicated for each of the inboard and outboard brake systems for each side of the aircraft, such that a failure in either the inboard or outboard braking systems on one side of the aircraft allows for continued operation of the other brake control system on that same side of the aircraft.

It will further be understood that the brake control system monitors the landing gear status and position of the aircraft as to whether it is on the ground or in the air to determine if the braking action is acceptable. Those skilled in the art will appreciate that the landing gear is the strut assembly having the wheels and brakes thereon, which is received within the body of the aircraft when in flight, and lowered and locked into an operative position when landing or taxiing on the ground. To monitor the status of the landing gear and attitude of the aircraft itself, switches 28–34 are provided. The switch 28 provides a signal from the landing gear if the landing gear is up and locked, as would typically be the case when the aircraft is in the air. The switch 30 provides a signal indicating the position of the pilot actuated landing gear handle situated in the cockpit itself. The switch 32 is the weight-on-wheels switch, sometimes referred to as the "squat" switch, which indicates that the aircraft has actually touched down and is on the ground. Finally, the switch 30 provides a landing gear signal which indicates that the landing gear is down and locked, as would be the case when the aircraft is landing or on the ground. Provided in association with each of the switches 28–34 are respective bias circuits 36–42 which scale and condition the outputs of the switches 28–34 for application to logic circuits 44, 46. These logic circuits monitor the status of the switches 28–34 and provide corresponding outputs to the OR gate 24 to actuate the shutoff valve driver 26 to energize the coil of the shutoff valve 12. As can be seen, the logic circuits 44, 46 are operative when the aircraft is in the air and the weight on wheels switch is not actuated.

The circuit 44 allows braking in the air when the gear handle is down, the weight on wheels switch has not been actuated (aircraft is in the air) and the gear is not down and locked. In this in-air-landing mode, test braking is achieved. In like manner, the circuit 46 produces an output signal when the gear handle is up and the weight on wheels switch has not been actuated (aircraft is in the air), and the gear is not up and locked. In this situation, after takeoff, while the wheels are spinning down, a short duration of brake application may be applied to bring the wheels to a complete stop before they are nested into the aircraft in the gear up and locked position.

In the preferred embodiment of the invention, analog signals from the brake pedals 14, 16 do not pass to the window comparators 18, 20 when the aircraft is in the air. The weight on wheels switch 32 allows the utilization of brake pedals 14, 16 to pass braking signals through the comparators 18, 20, and ultimately to the shutoff valve driver 26 only when the aircraft is on the ground. Accordingly, when in the air, the circuits 44, 46 are employed to provide a short duration brake application signal to the braking system. It is contemplated that each of the circuits 44, 46 includes a one-shot producing an output signal of a fixed duration (preferably 5 seconds) for passage through the OR gate 24 and for activation of the shutoff valve driver 26 for such a period of time. In other words, when the gear handle is placed into its down position by the pilot and it is determined that the weight on wheels switch 32 has not been activated and the gear is not down and locked, a five second signal is passed through the OR gate 24 to activate the shutoff valve driver 26 for a five second duration to correspondingly energize the coil 12a of the shutoff valve 12 to apply brake pressure to the brake system. In like manner, the one shot of control circuit 46 emits a five second signal when the gear handle is pulled into the upward position when the aircraft is in the air and the landing gear is not in the up and locked position. This five second application of brake pressure allows the brakes to terminate the spinning of the wheels after liftoff so that they can be brought into their locked and stored position.

As shown, the system 10 includes a programmed microprocessor 48 which has an output adapted to inhibit operation of the valve driver 26a of the dual shutoff valve driver 26, in contradistinction to the input from the circuit portions just described which is operative to activate the driver 26b. As can be seen, the inputs to the microprocessor 48 are the same as the inputs to the control circuits 44, 46 as well as the outputs of the OR gates 22, 24. The microprocessor 48 also receives inputs from a voltage sensing circuit 50 which is connected to the top side of the coil 12a of the shutoff valve 12 and a current sensing circuit 52 which senses the current passing through such coil. Also provided as inputs to the microprocessor 48 are the outputs of brake pressure transducers 58a, 60a, respectively associated with the brakes 58, 60, of the left and right wheels 54, 56. It is contemplated that the microprocessor 48 includes an analog to digital converter, such that the analog signals received, for example, from sensing circuits 50, 52 and the transducers 58, 60 can be appropriately converted to a digital format for processing.

It should be appreciated that the software of the microprocessor 48 receives and processes the same signals as the control circuits 44, 46. The software of the microprocessor 48 determines whether the shutoff valve 12 should be turned off or inhibited as a consequence of these inputs, while the control circuits 44, 46 determine if the shutoff valve is to be turned on as a consequence of such inputs. In other words, the software controlled valve driver 26a is normally on such that the driver 26b, controlled by the discrete circuit elements, is primarily responsible for actuating or opening the shut off valve 12. As a result, if either the microprocessor 48 or either of the control circuits 44, 46 demonstrate that brake pressure should not be applied, the shutoff valve 12 is either inhibited or not turned on such that the brakes of the system are disabled, preventing any inadvertent braking. As a result, inadvertent braking can only occur if both the software monitoring portion 48 and the hardware monitoring portion 44, 46 fail.

It should also be noted that the microprocessor 48 does not receive signals from the brake pedals 14, 16. Accordingly, it is only possible within the concept of the instant invention to have inadvertent braking when the pilots feet are on the pedal—which is when braking is generally desired, in any event.

It will also be seen that voltage sensing circuit 50 and current sensing circuit 52 sense if the operation of the shutoff valve driver 26 is proper and if the coil of the shutoff valve 12 has continuity. They also may be used in combination to determine if over-current shutdown has occurred, as well. Accordingly, monitoring of the operability and fail safe nature of the shutoff valve 12 may be undertaken. In the event that the voltage sensing circuit 50 and current sensing circuit 52 determine that undesired braking is occurring, the microprocessor 48 may inhibit the driver 26a to close the shut off valve 12 and inhibit such braking. Those skilled in the art will appreciate that the drivers 26a and 26b are typically power transistors or appropriate field effect transistors.

As is also seen, the microprocessor 48 receives outputs from both of the OR gates 22, 24 which allows it to determine the operability of the control circuits 44, 46.

It should now be apparent that the instant invention provides a brake-by-wire system which assures that inadvertent braking can only occur when a failure has occurred in each of two paths within the control system, one being a discrete component hardware path, and the other being one of software. Thus it can be seen that the objects of the invention have been satisfied by the structure presented above. While in accordance with the patent statutes, only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. An electrical brake control system for aircraft, comprising:

a brake coil shutoff valve providing hydraulic pressure to an aircraft brake system;

a shutoff valve driver connected to and selectively actuating said brake control shutoff valve;

a pair of operator actuated brake pedals allowing the pilot to regulate the hydraulic pressure applied to brakes of the aircraft;

a plurality of switches providing data respecting a positional status of a landing gear, a landing gear handle, and a weight-on-wheels switch;

a discrete logic circuit interposed between said plurality of switches and said shutoff valve driver for enabling said shutoff valve driver when said switches are in a first predetermined state; and a software controlled microprocessor interposed between said plurality of switches and said shutoff valve driver for inhibiting said shutoff valve driver when said switches are not in said first predetermined state.

2. The electrical brake control system for aircraft according to claim 1, wherein said logic circuit further enables said shutoff valve driver when said switches are in a second predetermined state and said software controlled microprocessor inhibits said shutoff valve driver when said switches are not in either said first or second predetermined states.

3. The electrical brake control system for aircraft according to claim 1, wherein said logic circuit enables said shutoff valve for a set period of time when said switches are in a first predetermined state.

4. The electrical brake control system for aircraft according to claim 1, further comprising a window comparator circuit interposed between said brake pedals and said shutoff valve driver, said window comparators enabling said shutoff valve driver when either of said brake pedals is actuated within a predetermined range.

5. The electrical brake control system for aircraft according to claim 4, wherein said brake pedals produce electrical signals indicative of brake pedal position.

6. The electrical brake control system for aircraft according to claim 4, wherein said software controlled microprocessor receives outputs from said comparator circuit and said discrete logic circuit.

7. The electrical brake control system for aircraft according to claim 1, further comprising a voltage sensor and a current sensor interposed between said brake coil shutoff valve and said software controlled microprocessor, said voltage and current sensors determining the existence of inadvertent braking.

8. The electrical brake control system for aircraft according to claim 7, further comprising brake pressure transducers associated with the brakes of the aircraft and connected to said software controlled microprocessor.

9. The electrical brake control system for aircraft according to claim 1, wherein said plurality of switches comprises a first switch indicating whether the aircraft is in the air or on land, a second switch indicating a position of said landing gear handle, a third switch indicating whether said landing gear is up and locked, and a fourth switch indicating whether said landing gear is down and locked.

* * * * *